(12) United States Patent  
Fairweather (10) Patent No.: US 7,103,749 B2
(45) Date of Patent: Sep. 5, 2006

(54) SYSTEM AND METHOD FOR MANAGING MEMORY

(76) Inventor: John Fairweather, 1649 Winslow Dr., Santa Monica, CA (US) 90405

( * ) Notice: Subject to any disclaimer, the term of this patent is extended or adjusted under 35 U.S.C. 154(b) by 432 days.

(21) Appl. No.: 10/357,288

(22) Filed: Feb. 3, 2003

(65) Prior Publication Data

US 2003/0182529 A1   Sep. 25, 2003

Related U.S. Application Data

(60) Provisional application No. 60/353,487, filed on Feb. 1, 2002.

(51) Int. Cl.
*G06F 12/00* (2006.01)
(52) U.S. Cl. .................. 711/208; 711/209; 711/215
(58) Field of Classification Search ............. 711/103, 711/208, 209, 221, 215, 112, 100; 717/119, 717/153
See application file for complete search history.

(56) References Cited

U.S. PATENT DOCUMENTS

| 5,303,392 | A | * | 4/1994 | Carney et al. ............ 717/153 |
| 5,339,406 | A | * | 8/1994 | Carney et al. ............ 714/45 |
| 5,375,241 | A | * | 12/1994 | Walsh ..................... 719/331 |
| 5,915,255 | A | * | 6/1999 | Schwartz et al. .......... 707/206 |
| 6,115,782 | A | * | 9/2000 | Wolczko et al. .......... 711/100 |
| 6,219,830 | B1 | * | 4/2001 | Eidt et al. ................ 717/139 |
| 6,539,460 | B1 | * | 3/2003 | Castelli et al. ........... 711/112 |
| 6,721,723 | B1 | * | 4/2004 | Gibson et al. ............ 707/2 |
| 6,748,481 | B1 | * | 6/2004 | Parry et al. .............. 711/100 |
| 2004/0044836 | A1 | * | 3/2004 | Wong et al. ............. 711/103 |

OTHER PUBLICATIONS

"The Vesta Repository: A File System Extension for Software Development"; Sheng-Yang Chiu et al.; Jun. 14, 1993; Systems Research Center, CA., vol. 106.*
Lindholm-Yellin, Verification of class Files, The Java Virtual Machine Specification, Addison-Wesley. Sep. 1996.*
Nodes and Arcs the Ideal Primitive Data Structures, E. Lowry, Digital Equipment Corporation (Nov. 1980).*
C.J. Date, "An Introduction to database systems", vol. 1, 4th Ed., Addison-Wesley Publishing Co., 1986, pp. 503-540.*

* cited by examiner

*Primary Examiner*—Pierre-Michel Bataille
(74) *Attorney, Agent, or Firm*—Merchant & Gould P.C.; Stanley J. Gradisar (57) ABSTRACT

A new memory tuple is described that creates both a handle as well as a reference to an item within the handle. The reference is created using an offset value that defines the physical offset of the data within the memory block. Thereafter, if references are passed in terms of their offset value, this value will be the same in any copy of the handle regardless of the machine. In a distributed computing environment, equivalence between handles is established in a single transaction between two communicating machines. Thereafter, the two machines can communicate about specific handle contents simply by using offsets.

22 Claims, 11 Drawing Sheets

```
typedef int32           ET_Offset;
typedef struct
{
    Handle          theView;
    ET_offset       theOffset;
} ET_ViewRef, *ET_ViewRefPtr;

#define VIEWREF_TO_PTR(vr) ((charPtr).(*vr.theView) + vr.theOffset)
#define PTR_TO_VIEWREF(hdl,ptr,vr) \
    (vr.theView = hdl; vr. theOffset = (charPtr)ptr - (charPtr) *hdl;}
```

```
typedef struct ET_Hdr
{
    int32      flags;       // Static & Dynamic flags used by Mitopia™
    ET_Offset  nextItem;    // ref to next item in handle
    ET_Offset  moveTo;      // ref to where structure has been moved to
    ET_Offset  moveFrom;    // ref to where structure has been moved from
    ET_Offset  parent;      // ref to parent or referencing structure
    UnsChar    version;     // structure version number & creator ID
    UnsChar    date[3];     // date of creation
} ET_Hdr;
```

SYSTEM AND METHOD FOR MANAGING MEMORY

This application claims the benefit of provisional No. 60/353,487 filed Feb. 1, 2002.

BACKGROUND OF THE INVENTION

The Macintosh® Operating system ("OS"), like all OS layers, provides an API where applications can allocate and de-allocate arbitrary sized blocks of memory from a heap. There are two basic types of allocation, viz: handles and pointers. A pointer is a non-relocatable block of memory in heap (referred to as *p in the C programming language, hereinafter "C"), while a handle is a non-relocatable reference to a relocatable block of memory in heap (referred to as **h in C). In general, handles are used in situations where the size of an allocation may grow, as it is possible that an attempt to grow a pointer allocation may fail due to the presence of other pointers above it. In many operating systems (including OS X on the Macintosh® the need for a handle is removed entirely as a programmer may use the memory management hardware to convert all logical addresses to and from physical addresses.

The most difficult aspect of using handle based memory, however, is that unless the handle is 'locked', the physical memory allocation for the handle can move around in memory by the memory manager at any time. Movement of the physical memory allocation is often necessary in order to create a large enough contiguous chunk for the new block size. The change in the physical memory location, however, means that one cannot 'de-reference' a handle to obtain a pointer to some structure within the handle and pass the pointer to other systems as the physical address will inevitably become invalid. Even if the handle is locked, any pointer value(s) are only valid in the current machine's memory. If the structure is passed to another machine, it will be instantiated at a different logical address in memory and all pointer references from elsewhere will be invalid. This makes it very difficult to efficiently pass references to data. What is needed, then, is a method for managing memory references such that a reference can be passed to another machine and the machine would be able to retrieve or store the necessary data even if the physical address of the data has been changed when transferred to the new machine or otherwise altered as a result of changes to the data.

SUMMARY OF THE INVENTION

The following invention provides a method for generating a memory reference that is capable of being transferred to different machine or memory location without jeopardizing access to relevant data. Specifically, the memory management system and method of the present invention creates a new memory tuple that creates both a handle as well as a reference to an item within the handle. In the latter case, the reference is created using an offset value that defines the physical offset of the data within the memory block. If references are passed in terms of their offset value, this value will be the same in any copy of the handle regardless of the machine. In the context of a distributed computing environment, all that then remains is to establish the equivalence between handles, which can be accomplished in a single transaction between two communicating machines. Thereafter, the two machines can communicate about specific handle contents simply by using offsets.

Figure 1:
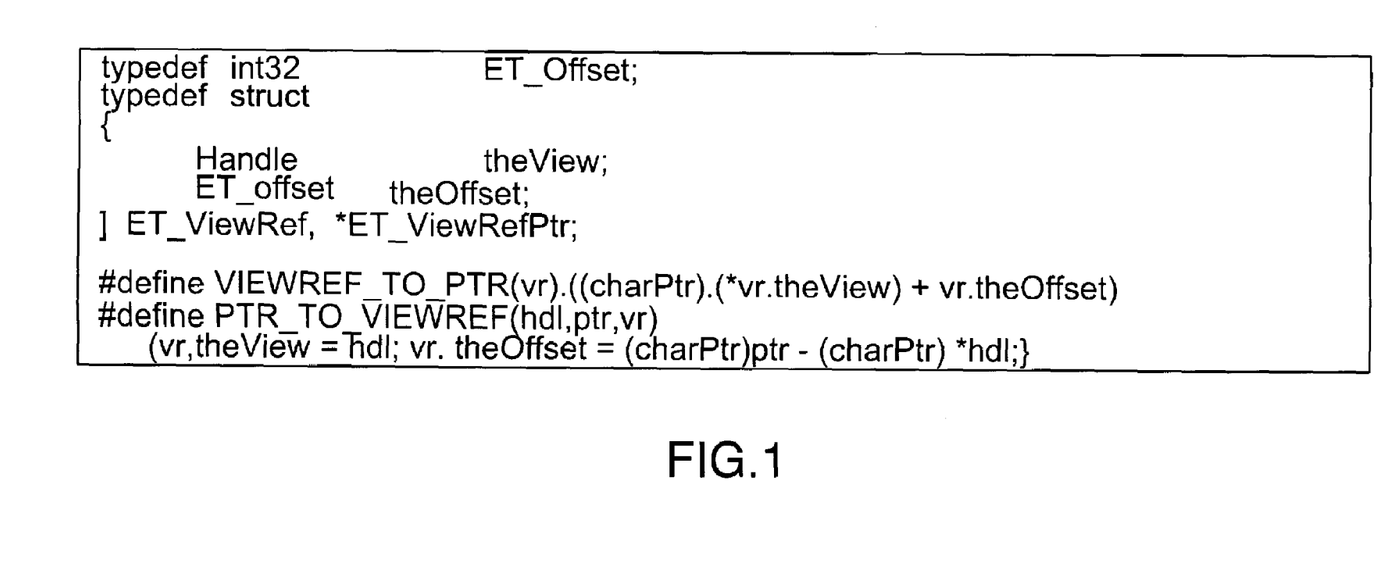
FIG. 1 illustrates sample code used to create the minimum reference 'tuple' of the present invention.

The minimum reference is therefore a tuple comprised of the handle together with the offset into the memory block, we shall call such a tuple an 'ET_ViewRef' and sample code used to create such a tuple 100 in C is provided in FIG. 1. Once this tuple has been created, it becomes possible to use the ET_ViewRef structure as the basic relocatable handle reference in order to reference structures internal to the handle even when the handle may move. The price for this flat memory model is the need for a wrapper layer that transparently handles the kinds of manipulations described above during all de-referencing operations, however, even with such a wrapper, operations in this flat memory model are considerably faster than corresponding OS supplied operations on the application heap.

DETAILED DESCRIPTION

Descriptive Conventions

In order to graphically describe the architectural components and interrelations that comprise the software, this document adopts a number of formalized drawing conventions. In general, any given software aspect is built upon a number of sub-layers. Referring now to FIG. 2, a block diagram is provided that depicts these sub-layers as a 'stack' of blocks. The lowest block is the most fundamental (generally the underlying OS) and the higher block(s) are successive layers of abstraction built upon lower blocks. Each such block is referred to interchangeably as either a module or a package.

Figure 2A:
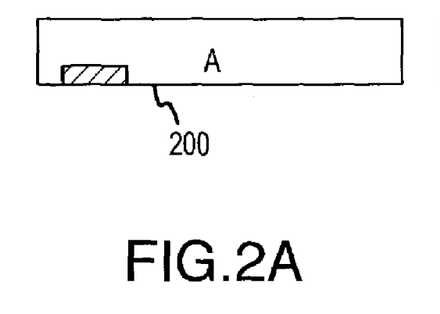
FIGS. 2A, 2B, 2C, and 2D illustrate a drawing convention that is used to describe the interrelationship between sub-layers in one embodiment of the present invention.

The first, an opaque module 200, is illustrated as a rectangle in FIG. 2A. An opaque module 200 is one that cannot be customized or altered via registered plug-ins. Such a form generally provides a complete encapsulation of a given area of functionality for which customization is either inappropriate or undesirable.

Figure 2B:
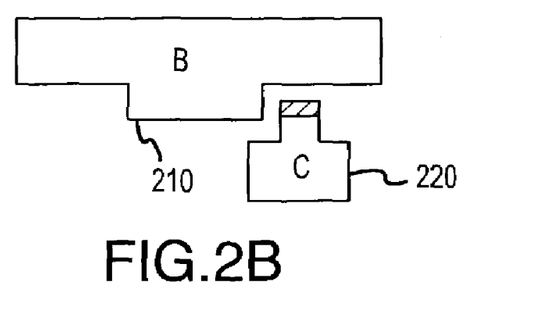

The second module, illustrated as T-shaped form 210 in FIG. 2B, represents a module that provides the ability to register plug-in functions that modify its behavior for particular purposes. In FIG. 2B, these plug-ins 220 are shown as 'hanging' below the horizontal bar of the module 210. In such cases, the module 210 provides a complete 'logical' interface to a certain functional capability while the plug-ins 220 customize that functionality as desired. In general, the plug-ins 220 do not provide a callable API of their own. This methodology provides the benefits of customization and flexibility without the negative effects of allowing application specific knowledge to percolate any higher up the stack than necessary. Generally, most modules provide a pre-defined set of plug-in behaviors so that for normal operation they can be used directly without the need for plug-in registration.

In any given diagram, the visibility of lower layers as viewed from above, implies that direct calls to that layer from higher-level layers above is supported or required as part of normal operation. Modules that are hidden vertically by higher-level modules, are not intended to be called directly in the context depicted.

Figure 2C:
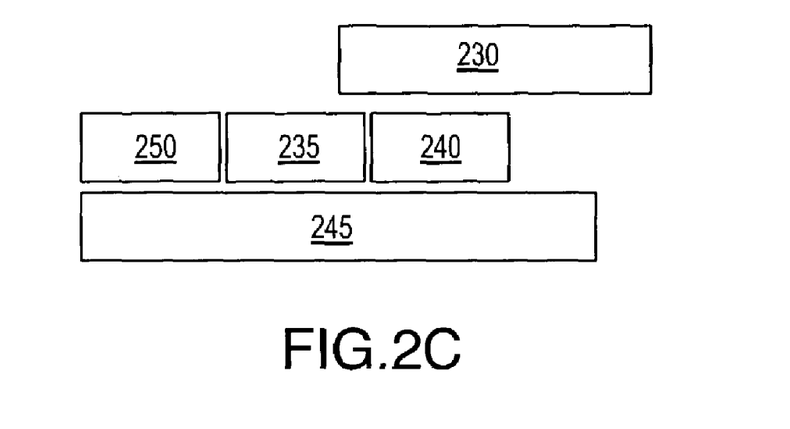

FIG. 2C illustrates this descriptive convention. Module 230 is built upon and makes use of modules 235, 240, and 245 (as well as what may be below module 245). Module 230, 235 and 240 make use of module 245 exclusively. The functionality within module 240 is completely hidden from higher level modules via module 230, however direct access to modules 250 and 235 (but not 245) is still possible.

Figure 2D:
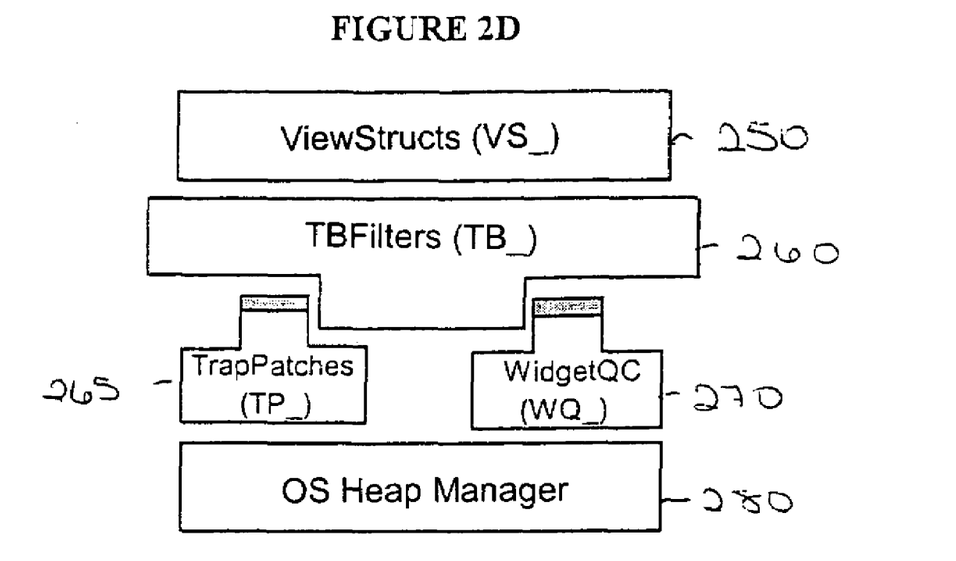

In FIG. 2D, the Viewstructs memory system and method 250 is illustrated. The ViewStructs 250 package (which implements the memory model described herein) is layered directly upon the heap memory encapsulation 280 provided by the TBFilters 260, TrapPatches 265, and WidgetQC 270 packages. These three packages 260, 265, 270 form the heap memory abstraction, and provide sophisticated debugging and memory tracking capabilities that are discussed elsewhere. When used elsewhere, the terms ViewStructs or memory model apply only to the contents of a single handle within the heap.

Figure 3:
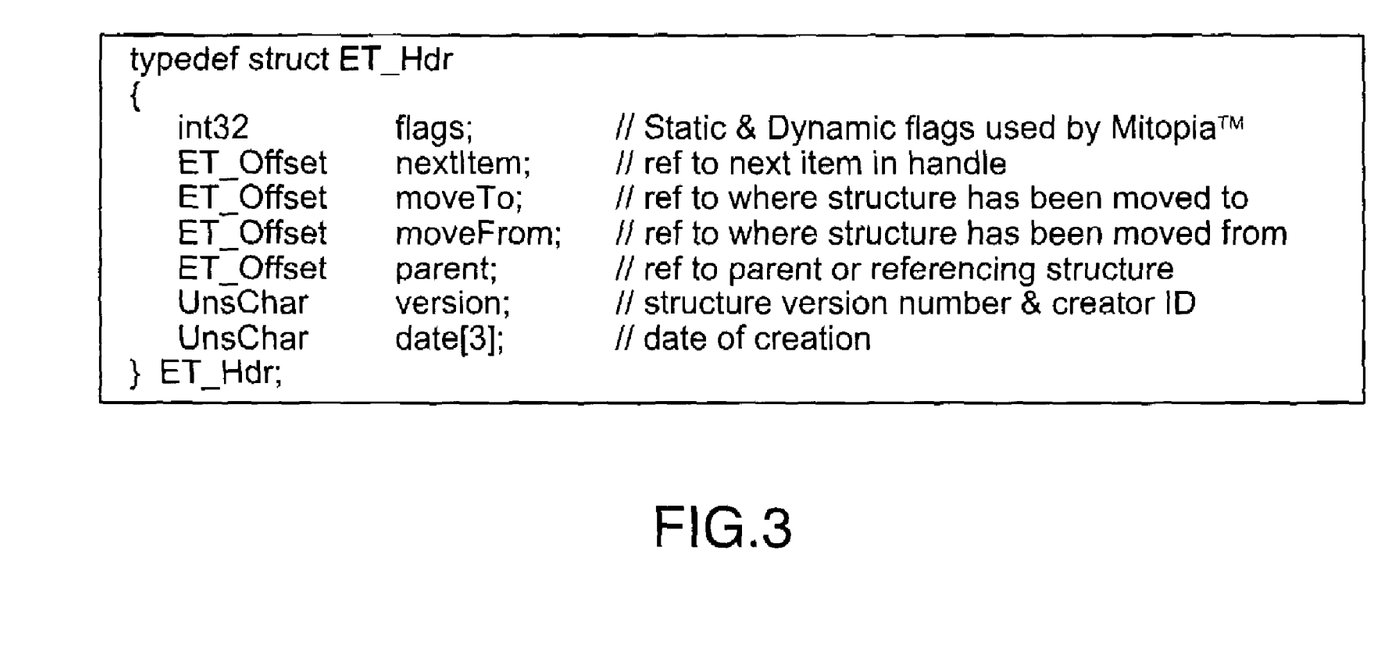
FIG. 3 illustrates a sample header block that may be used to practice the present invention.

To reference and manipulate variable sized structures within a single memory allocation, we require that all structures start with a standard header block. A sample header block (called an ET_Hdr) may be defined in C programming language as illustrated in FIG. 3. For the purpose of discussing the memory model, we shall only consider the use of ET_Offset fields 310, 320, 330, 340. The word 'flags' 305, among other things, indicates the type of record that follows the ET_Hdr. The 'version' 350 and 'date' fields 360 are associated with the ability to map old or changed structures into the latest structure definition, but these fields 350, 360 are not necessary to practice the invention and are not discussed herein.

Figure 4:
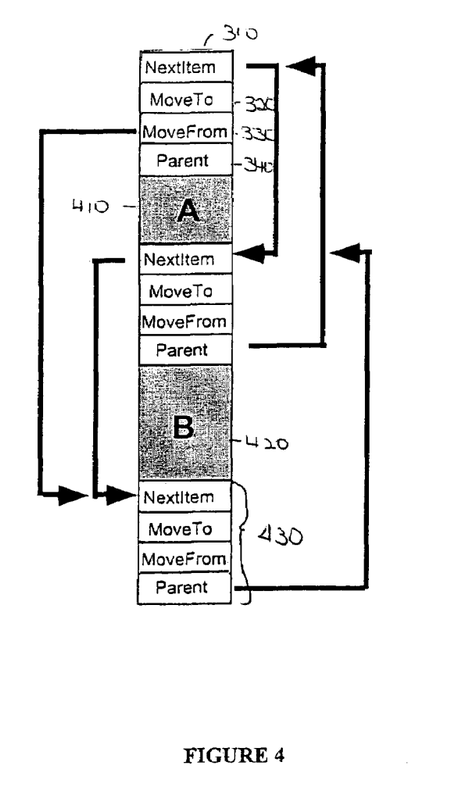
FIG. 4 illustrates a simple initial state for a handle containing multiple structures.

Referring now to FIG. 4, FIG. 4 illustrates a simple initial state for a handle containing multiple structures. The handle contains two distinct memory structures, structure 410 and structure 420. Each structure is preceded by a header record, as previously illustrated in FIG. 3, which defines its type (not shown) and its relationship to other structures in the handle. As can be seen from the diagram, the 'NextItem' field 310 is simply a daisy chain where each link simply gives the relative offset from the start of the referencing structure to the start of the next structure in the handle. Note that all references in this model are relative to the start of the referencing structure header and indicate the (possibly scaled) offset to the start of the referenced structure header. The final structure in the handle is indicated by a header record 430 with no associated additional data where 'NextItem=0'. By following the 'NextItem' daisy chain it is possible to examine and locate every structure within the handle.

As the figure illustrates, the 'parent' field 340 is used to indicate parental relationships between different structures in the handle. Thus we can see that structure B 420 is a child of structure A 410. The terminating header record 430 (also referred to as an ET_Null record) always has a parent field that references the immediately preceding structure in the handle. Use of the parent field in the terminating header record 430 does not represent a "parent" relationship, it is simply a convenience to allow easy addition of new records to the handle. Similarly, the otherwise meaningless 'moveFrom' field 330 for the first record in the handle contains a relative reference to the final ET_Null. This provides an expedient way to locate the logical end of the handle without the need to daisy chain through the 'NextItem' fields for each structure.

Figure 5:
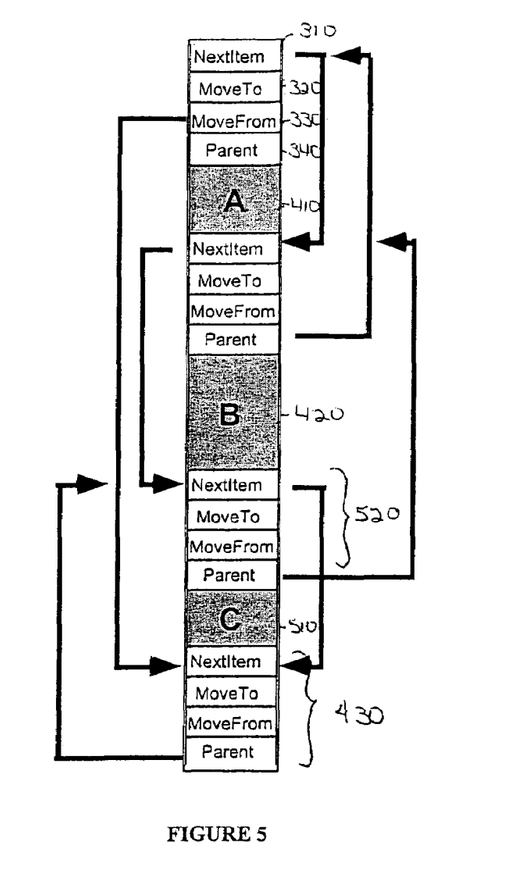
FIG. 5 illustrates the type of logical relationships that may be created between structures in a handle following the addition of a new structure.

Referring now to FIG. 5, FIG. 5 illustrates the logical relationship between the structures after adding a third structure C 510 to the handle. As shown in FIG. 5, structure C 510 is a child of B 420 (grandchild of A 410). The insertion of the new structure involves the following steps:

1) If necessary, grow the handle to make room for C 510, C's header 520, and the trailing ET_Null record 430;
2) Overwrite the previous ET_Null 430 with the header and body of structure C 510.
3) Set up C's parent relationship. In the illustrated example, structure C 510 is a child of B 420, which is established by pointing the 'parent' field of C's header file 520 to the start of structure B 420.
4) Append a final ET_Null 530, with parent referenced to C's header 520.
5) Adjust the 'moveFrom' field 330 to reflect the offset of the new terminating ET_Null 530.

In addition to adding structures, the present invention must handle growth within existing structures. If a structure, such as structure B 420, needs to grow, it is often problematic since there may be another structure immediately following the one being grown (structure C 510 in the present illustration). Moving all trailing structures down to make enough room for the larger B 420 is one way to resolve this issue but this solution, in addition to being extremely inefficient for large handles, destroy the integrity of the handle contents, as the relative, references within the original B structure 420 would be rendered invalid once such a shift had occurred. The handle would then have to be scanned looking for such references and altering them. The fact that structures A 410, B 420, and C 510 will generally contain relative references over and above those in the header portion make this impractical without knowledge of all structures that might be part of the handle. In a dynamic computing environment such knowledge would rarely, if ever, be available, making such a solution impractical and in many cases impossible.

Figure 6:
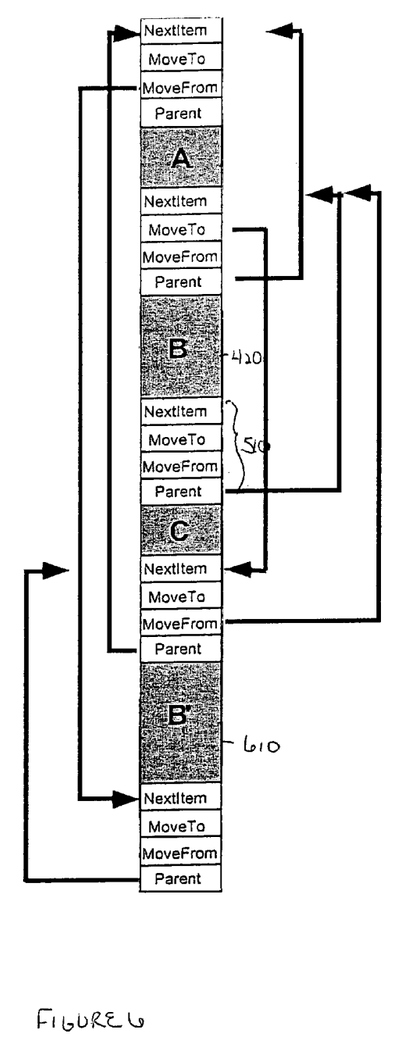
FIG. 6 illustrates a sample of a handle after increasing the size of a given structure within the handle beyond its initial physical memory allocation.

For these reasons, the header for each structure further includes a moveFrom and moveTo fields. FIG. 6 illustrates the handle after growing B 420 by adding the enlarged B' structure 610 to the end of the handle. As shown, the original B structure 420 remains where it is and all references to it (such as the parent reference from C 510) are unchanged. B 420 is now referred to as the "base record" whereas B' 610 is the "moved record". Whenever any reference is resolved now, the process of finding the referenced pointer address using C code is:

```
src = address of referencing structure header
dst = src + ET_Offset value for the reference
if ( dst->moveTo )
    dst = dst + dst->moveTo    --follow the move
```

Further whenever a new reference is created, the process of finding the referenced pointer using C code is:

```
src = address of referencing structure header
dst = address of referenced structure header
if ( dst->moveFrom )
    dst = dst + dst->moveFrom;
ref value = dst - src
```

Thus, the use of the moveto and movefrom fields ensures that no references become invalid, even when structures must be moved as they grow.

Figure 7:
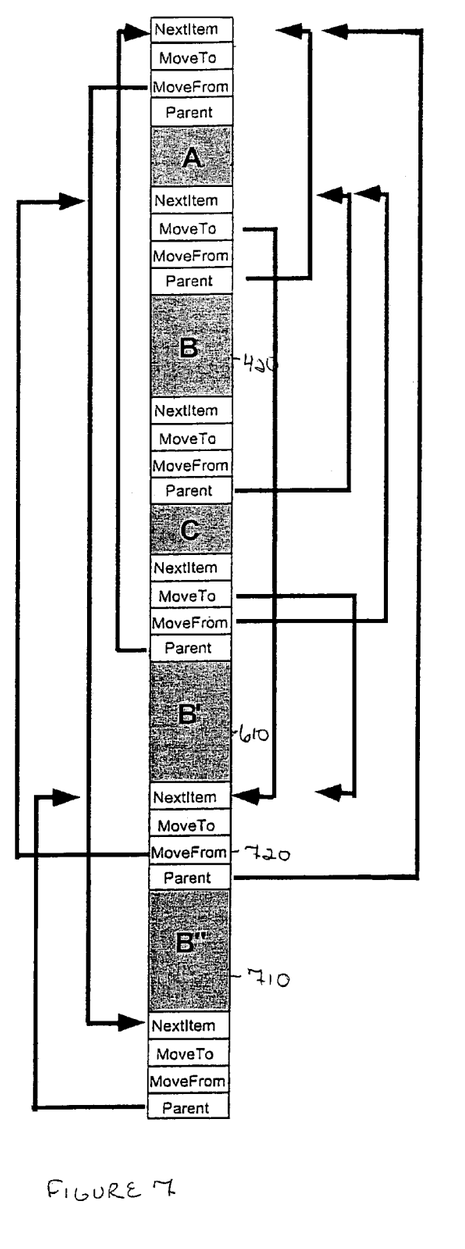
FIG. 7 illustrates the manner in which a handle could be adapted to enable unlimited growth to a given structure within the handle.

FIG. 7 illustrates the handle when B 420 must be further expanded into B" 710. In this case the 'moveTo' of the base record 420 directly references the most recent version of the structure, in this example B" 710. Correspondingly, the record B" 710 now has a 'moveFrom' 720 field that references the base record 420. B's moveFrom 720 still refers back to B 420 and indeed if there were more intermediate records between B 420 and B" (such as B' 610 in this example) the 'moveTo' and 'moveFrom' fields for all of the records 420, 610, 710 would form a doubly linked list. Once each of these records 420, 610, 710 have been linked, it is possible to re-trace through all previous versions of a structure using these links. For example, one could find all previous versions of the record starting with B" 710 by following the 'movefrom' field 720 to the base record 420 and then following the 'NextItem' link of each record until a record with a 'moveFrom' referencing the base record 420 is found. Alternatively, and perhaps more reliably, one could look for structures whose 'moveTo' field references record 420 and then work backward through the chain to find earlier versions.

This method, in which the last 'grown' structure moves to the end of the handle, has the beneficial effect that the same structure is often grown many times in sequence and in these cases we can optionally avoid creating a series of intermediate 'orphan' records. References occurring from within the bodies of structures may be treated in a similar manner to those described above and thus by extrapolation one can see that arbitrarily complex collections of cross-referencing structures can be created and maintained in this manner all within a single 'flat' memory allocation.

The price for this flat memory model is the need for a wrapper layer that transparently handles the kinds of manipulations described above during all de-referencing operations, however, even with such a wrapper, operations in this flat memory model are considerably faster than corresponding OS supplied operations on the application heap. Regardless of complexity, a collection of cross-referencing structures created using this approach is completely 'flat' and the entire 'serialization' issue is avoided when passing such collections between processors. This is a key requirement in a distributed data-flow based environment.

Figure 8:
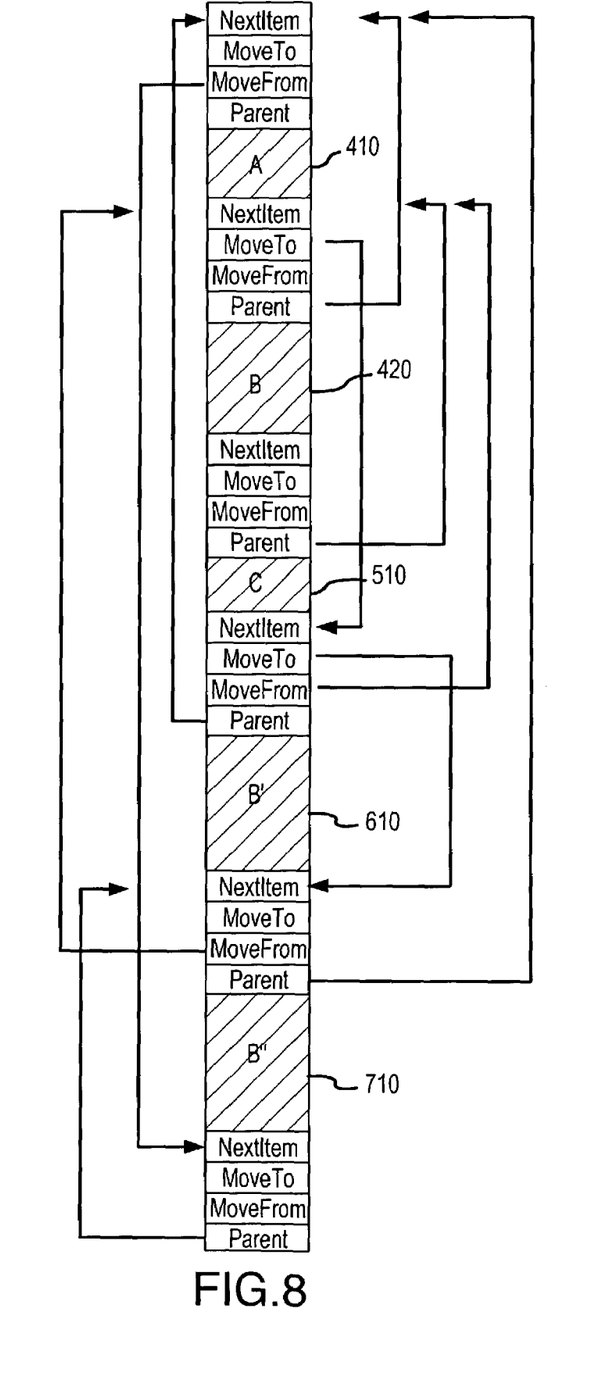
FIG. 8 illustrates the handle after performing an undo operation.

In addition to providing the ability to grow and move structures without impacting the references in other structures, another advantage of the 'moveTo'/'moveFrom' approach is inherent support for 'undo'. FIG. 8 illustrates the handle after performing an 'undo' on the change from B' to B". The steps involved for 'undo' are provided below:

```
src = base record (i.e., B)
dst = locate 'moved' record (i.e. B") by following 'moveTo' of
base record
prev = locate last record in handle whose 'moveTo' references dst
src->moveTo = prev - src;
```

The corresponding process for 'redo' (which restores the state to that depicted after B" was first added) is depicted below:

```
src = base record (i.e., B)
dst = locate 'moved' record (i.e. B') by following 'moveTo' of base
record
if ( dst->moveTo )
    nxt = dst + dst->moveTo
src->moveTo = nxt - src;
```

This process works because of the fact that 'moveTo' fields are only followed once when referencing via the base record. The ability to trivially perform undo/redo operations is very useful in situations where the structures involved represent information being edited by the user, it is also an invaluable technique for handling the effects of a time axis in the data.

Figure 9:
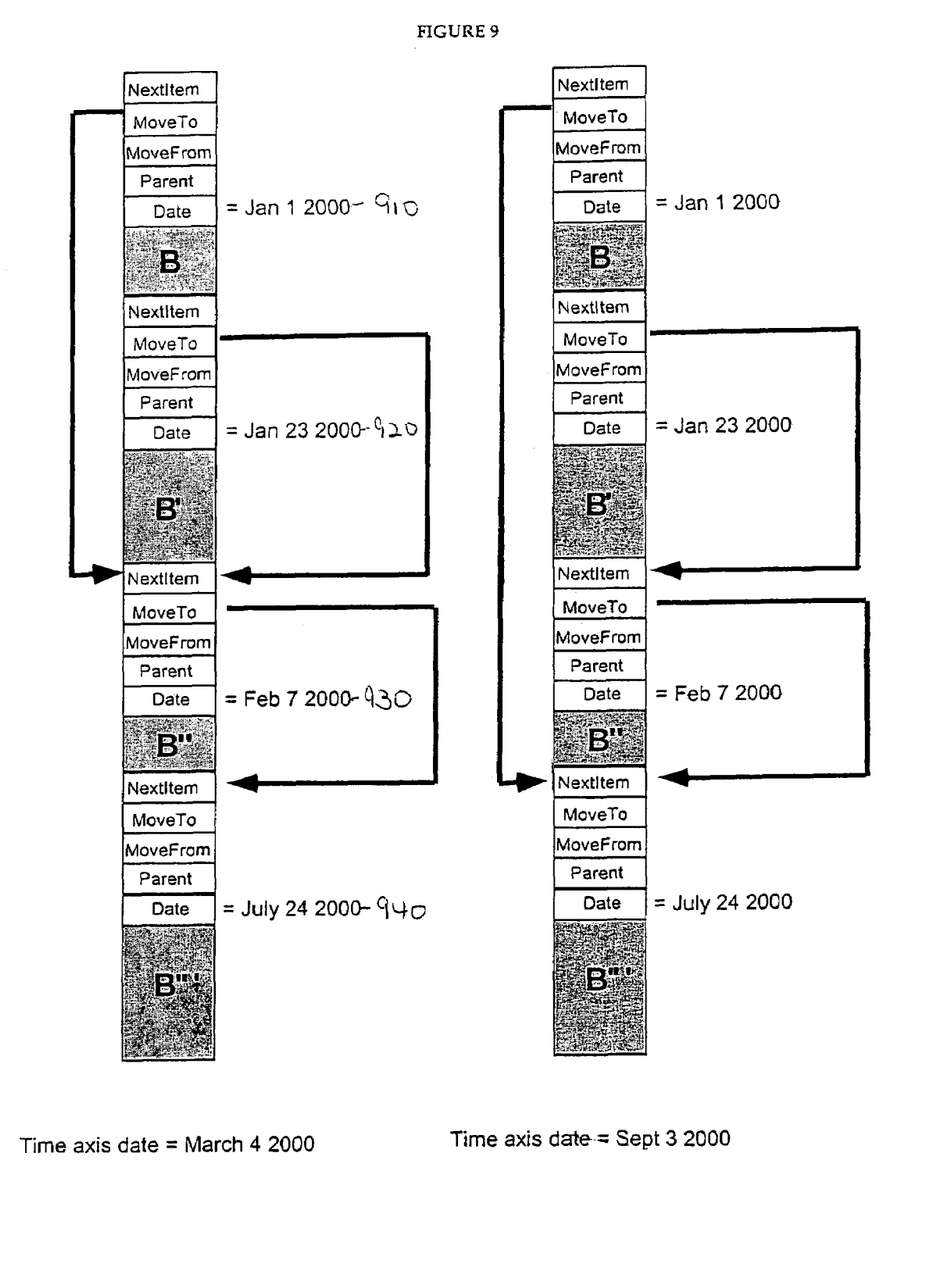
FIG. 9 illustrates a handle that has been adapted to include a time axis in the header field of the structures within the handle.

One method for maintaining a time axis is by using a date field in the header of each structure. In this situation, the undo/redo mechanism can be combined with a 'date' field 910 in the header that holds the date when the item was actually changed. This process is illustrated in FIG. 9 (some fields have been omitted for clarity).

This time axis can also be used to track the evolution of data over time. Rather than using the 'moveTo' fields to handle growing structures, the 'moveTo' fields could be used to reference future iterations of the data. For example, the base record could specify that it stores the high and low temperatures for a given day in Cairo. Each successive record within that chain of structures could then represent the high and low temperatures for a given date 910, 920, 930, 940. By using the 'date' fields 910, 920, 930, 940 in this fashion, the memory system and method can be used to represent and reference time-variant data, a critical requirement of any system designed to monitor, query, and visualize information over time. Moreover, this ability to handle time variance exists within the 'flat' model and thus data can be distributed throughout a system while still retaining variance information. This ability lends itself well to such things as evolving simulations, database record storage and transaction rollback, and animations.

Additionally, if each instance of a given data record represents a distinct version of the data designed for a different 'user' or process, this model can be used to represent data having multiple values depending on context. To achieve this, whatever variable is driving the context is simply used to set the 'moveTo' field of the base record, much like time was used in the example above. This allows the model to handle differing security privileges, data whose value is a function of external variables or state, multiple distinct sources for the same datum, configuration choices, user interface display options, and other multi-value situations.

A 'flags' field could also be used in the header record and can be used to provide additional flexibility and functionality within the memory model. For example, the header could include a 'flag' field that is split into two parts. The first portion could contain arbitrary logical flags that are defined on a per-record type basis. The second portion could be used to define the structure type for the data that follows the header. While the full list of all possible structure types is a matter of implementation, the following basic types are examples of types that may be used and will be discussed herein:

kNullRecord—a terminating NULL record, described above.

kStringRecord—a 'C' format variable length string record.

kSimplexRecord—a variable format/size record whose contents is described by a type-id.

kComplexRecord—a 'collection' element description record (discussed below)

kOrphanRecord—a record that has been logically deleted/orphaned and no longer has any meaning.

By examining the structure type field of a given record, the memory wrapper layer is able to determine 'what' that record is and more importantly, what other fields exist within the record itself that also participate in the memory model, and must be handled by the wrapper layer. The following definition describes a structure named 'kComplexRecord' and will be used to illustrate this method:

```
typedef struct ET_Complex           //    Collection element record
{
    ET_Hdr                          hdr;        // Standard header
    ...
    ET_Offset /* ET_SimplexPtr   */ valueR;     // value reference
    ET_TypeID                       typeID;     // ID of this type
    ET_Offset /* ET_ComplexPtr   */ nextElem;   // next elem. link
    ET_Offset /* ET_ComplexPtr   */ prevElem;   // prev. elem. link
    ET_Offset /* ET_ComplexPtr   */ childHdr;   // First child link
    ET_Offset /* ET_ComplexPtr   */ childTail;  // Last child link
    ...
} ET_Complex;
```

The structure defined above may be used to create arbitrary collections of typed data and to navigate around these collections. It does so by utilizing the additional ET_Offset fields listed above to create logical relationships between the various elements within the handle.

Figure 10:
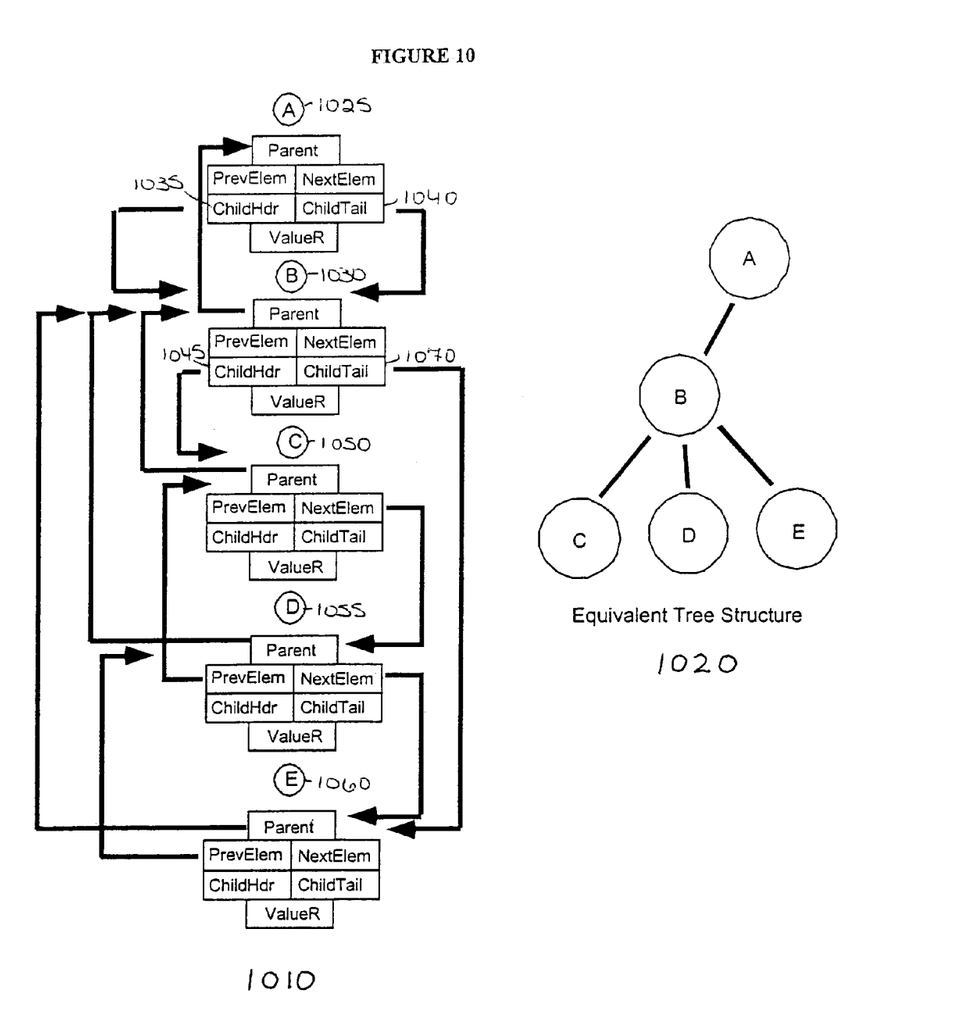
FIG. 10 illustrates the manner in which the present invention can be used to store data as a hierarchical tree.

FIG. 10 illustrates the use of this structure 1010 to represent a hierarchical tree 1020. The ET_Complex structure defined above is sufficiently general, however, that virtually any collection metaphor can be represented by it including (but not limited to) arrays (multi-dimensional), stacks, rings, queues, sets, n-trees, binary trees, linked lists etc. The 'moveTo', 'moveFrom' and 'NextItem' fields of the header have been omitted for clarity. The 'valueR' field would contain a relative reference to the actual value associated with the tree node (if present), which would be contained in a record of type ET_Simplex. The type ID of this record would be specified in the 'typeID' field of the ET_Complex and, assuming the existence of an infrastructure for converting type IDs to a corresponding type and field arrangement, this could be used to examine the contents of the value (which could further contain ET_Offset fields as well).

As FIG. 10 illustrates, 'A' 1025 has only one child (namely 'B' 1030), both the 'childHdr' 1035 and 'childTail' 1040 fields reference 'B' 1030, this is in contrast to the 'childHdr' 1045 and 'childTail' 1070 fields of 'B' 1030 itself which reflect the fact that 'B' 1030 has three children 1050, 1055, 1060. To navigate between children 1050, 1055, 1060, the doubly-linked 'NextItem' and 'prevItem' fields are used. Finally the 'parent' field from the standard header is used to represent the hierarchy. It is easy to see how simply by manipulating the various fields of the ET_Complex structure, arbitrary collection types can be created as can a large variety of common operations on those types. In the example of the tree above, operations might include pruning, grafting, sorting, insertion, rotations, shifts, randomization, promotion, demotion etc. Because the ET_Complex type is 'known' to the wrapper layer, it can transparently handle all the manipulations to the ET_Offset fields in order to ensure referential integrity is maintained during all such operations. This ability is critical to situations where large collections of disparate data must be accessed and distributed (while maintaining 'flatness') throughout a system.

Figure 11:
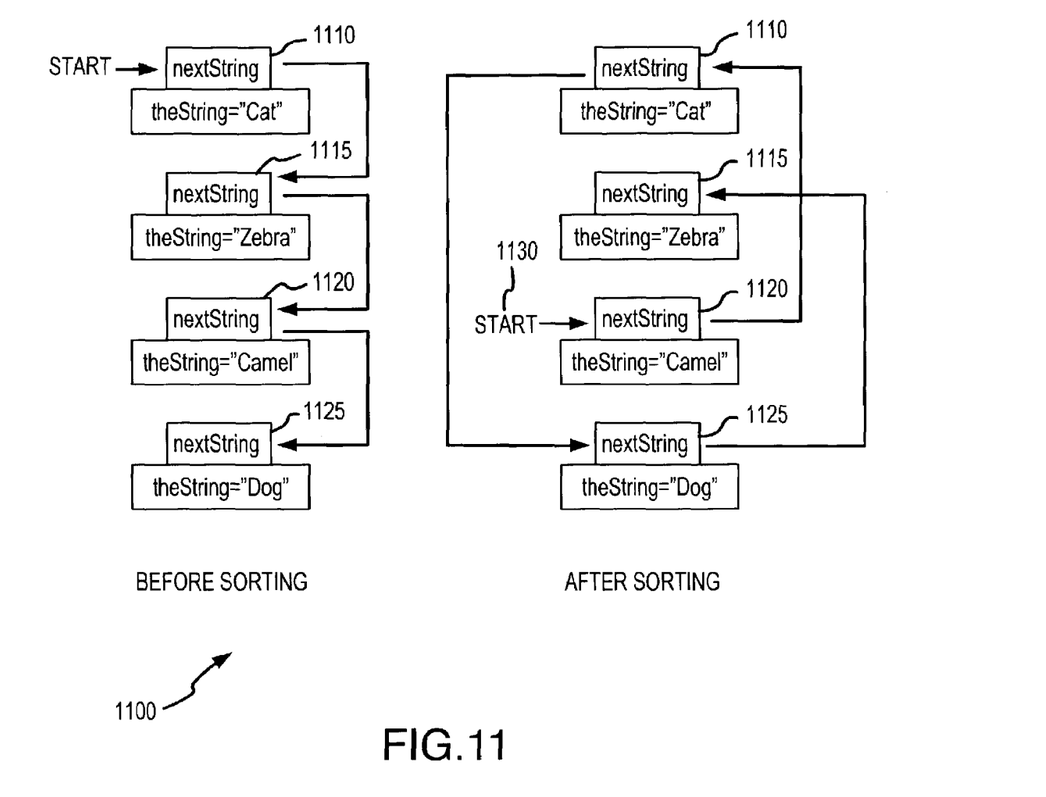
FIG. 11 illustrates the process for using the memory model to sort structures within a handle.

FIG. 11 illustrates the process for using the memory model to "sort" various structures. A sample structure, named ET_String 1100, could be defined in the following manner (defined below) to perform sorting on variable sized structures:

```
typedef struct ET_String                           // String Structure
{
    ET_Hdr     hdr;                                // Standard header
    ET_Offset /* ET_StringPtr */ nextString;       // ref. to next string
    ...
    char       theString[ 0 ];                     // C string (size varies)
} ET_String;
```

Prior to the sort, the 'nextString' fields 1110, 1115, 1120, 1125 essentially track the 'NextItem' field in the header, indeed 'un-sort' can be trivially implemented by taking account of this fact. By accessing the strings in such a list by index (i.e., by following the 'nextString' field), users of such a 'string list' abstraction can manipulate collections of variable sized strings. When combined with the ability to arbitrarily grow the string records as described previously (using 'moveTo' and 'moveFrom'), a complete and generalized string list manipulation package is relatively easy to implement. The initial 'Start' reference 1130 in such a list must obviously come from a distinct record, normally the first record in the handle. For example, one could define a special start record format for containers describing executable code hierarchies. The specific implementation of these 'start' records are not important. What is important, however, is that each record type contain a number of ET_Offset fields that can be used as references or 'anchors' into whatever logical collection(s) is represented by the other records within the handle.

Figure 12A:
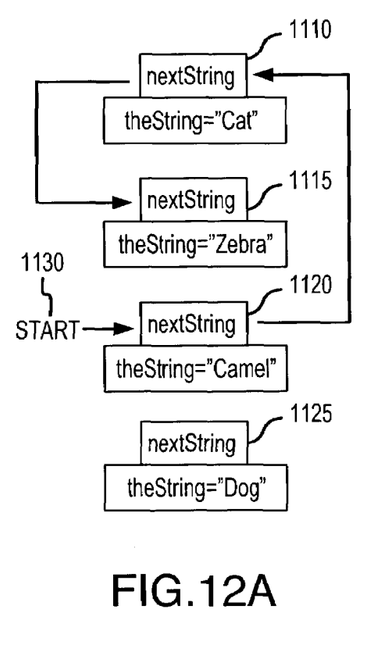
FIGS. 12A and 12B illustrate the process of deleting structures in the memory model of the present invention.
Figure 12B:
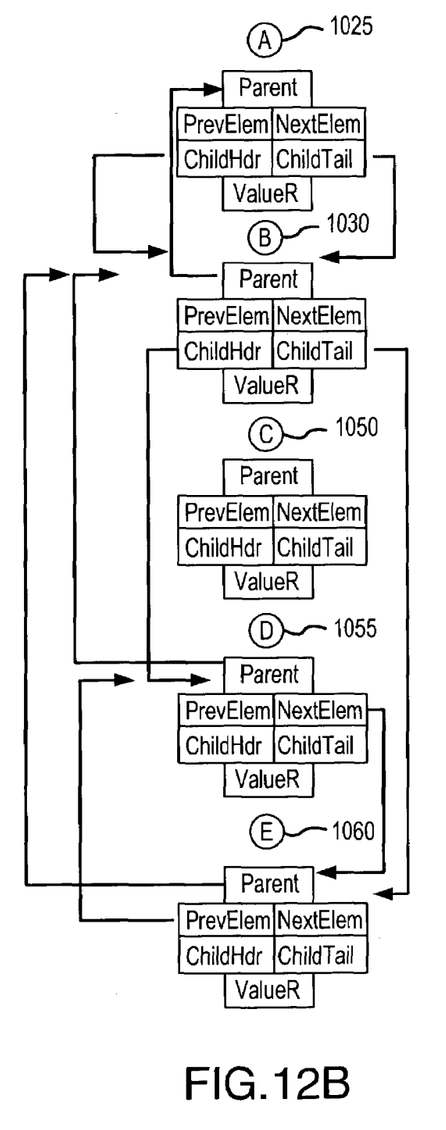

The process of deleting a structure in this memory model relates not so much to the fields of the header record itself, but rather to the fields of the full structure and the logical relationships between them. In other words, the record itself is not deleted from physical memory, rather it is logically deleted by removing from all logical chains that reference it. The specific manner in which references are altered to point "around" the deleted record will thus vary for each particular record type. FIGS. 12A and 12B illustrate the situation after deleting "Dog" 1125 from the string list 1100 (FIG. 12A) and 'C' 1050 from the tree 1020 (FIG. 12B).

When being deleted, the deleted record is generally 'orphaned'. In order to more easily identify the record as deleted, a record may be set to a defined record type, such as 'kOrphanRecord'. This record type could be used during compression operations to identify those records that have been deleted. A record could also be identified as deleted by confirming that it is no longer referenced from any other structure within the handle. Given the complete knowledge that the wrapper layer has of the various fields of the structures within the handle, this condition can be checked with relative ease and forms a valuable double-check when particularly sensitive data is being deleted.

The compression process involves movement of higher structures down to fill the gap and then the subsequent adjustment of all references that span the gap to reduce the reference offset value by the size of the gap being closed during compression. Once again, the fact that the wrapper layer has complete knowledge of all the ET_Offset fields within the structures in the handle make compression a straightforward operation.

The foregoing description of the preferred embodiment of the invention has been presented for the purposes of illustration and description. For example, the term "handle"throughout this description is addressed as it is currently used in the Macintosh® OS. This term should not be narrowly construed to only apply to the Macintosh® OS however, as the method and system could be used to enhance any sort of memory management system. The descriptions of the header structures should also not be limited to the embodiments described. While the defined header structures provide examples of the structures that may be used, the plurality of header structures that could in fact be implemented is nearly limitless. Indeed, it is the very flexibility afforded by the memory management system that serves as its greatest strength. For these reasons, this description is not intended to be exhaustive or to limit the invention to the precise form disclosed. Many modifications and variations are possible in light of the above teaching. In particular due to the simplicity of the model, hardware based implementations can be envisaged. It is intended that the scope of the invention be limited not by this detailed description, but rather by the claims appended hereto.

I claim the following inventions:

1. A system for storing, accessing, and exchanging generalized in-memory data within a running program environment, the system comprising:

a reference to a block of physical memory from a standard operating system supplied heap allocation facility or other standard memory allocation scheme;

one or more memory structures stored within said block of physical memory, said memory structures each having a space allocated for a header and a data portion; and one or more fields within said header for linking to said one or more memory structures that are related to a first memory structure within said block of physical memory, wherein said one or more fields are based on a relative memory offset between a referencing header and a referenced header within said block of physical memory.

2. The system of claim 1, wherein said one or more fields for linking to said one or more memory structures that are related to said first memory structure includes a move to field based on said relative memory offset between a referencing said memory structure and a referenced said memory structure, and where said one or more memory structures accessible by following the move to field represent alternate versions of said referencing memory structures within said block of physical memory.

3. The system of claim 2, wherein said move to fields for linking to/from another said memory structure are comprised of an offset value, wherein said offset value is a physical memory offset between a start of said block of physical memory and a start of a linked said memory structure.

4. The system of claim 1, wherein said move to fields for linking to/from another said memory structure are comprised of an offset value, wherein said offset value is a signed physical memory offset between said referencing header and said referenced headere of two said memory structures involved.

5. The system of claim 1, wherein said header further comprises a field for storing a date.

6. The system of claim 5, wherein said field included within said header for storing said date is assigned a date upon which a data contained within said data portion of said memory structure was first collected, stored, or updated.

7. The systems of claim 5, wherein said move to fields storee a series of said memory structures relating to a single logical base structure that can be altered to cause said single logical base structure to reference one of a number of alternative versions of said memory structure.

8. The systems of claim 7, wherein a control of a particular value of said move to fields is based on an algorithm.

9. The system of claim 7, further comprising means for providing wrapper support, said wrapper support means enabling alteration of said move to field references to an earlier state using a specific date, a current state, or an algorithm.

10. The system of claim 7, further comprising means for providing wrapper support, said wrapper support means enabling alteration of said move to references to a current state.

11. The system of claim 7, further comprising means for providing wrapper support, said wrapper support means enabling alteration of said move to references to an earlier state using an algorithm.

12. A method for storing, accessing, and exchanging generalized in-memory data within a running program environment, comprising the steps of:

obtaining a reference to a block of physical memory from a standard operating system supplied heap allocation facility or other standard memory allocation scheme;

creating one or more memory structures to be stored within said block of physical memory, said memory structures each having a space allocated for a header and a data portion;

creating said header for said memory structures, wherein said header includes a field for linking to a next said memory structure in said block of physical memory based on a relative memory offset between a referencing header and a referenced header within said block of physical memory, and further wherein said header includes a field for identifying additional data structures unique to a particular type of said memory structure; and storing said header within a corresponding said memory structure.

13. The method of claim 12, further comprising the step of:

assigning additional values to said fields in said header using one or more offset values, said offset values representing a physical memory offset between a start of said block of physical memory and said memory structure being linked, or a signed physical offset between said referencing headers and said referenced headers of said memory structures involved in said reference.

14. The method of claim 12, further comprising the step of:

assigning additional values to said fields in said header using one or more offset values, said offset values representing a signed physical offset between said referencing headers and said referenced headers of said memory structures involved in said reference.

15. The method of claim 12, wherein said step of obtaining said reference to said block of physical memory further comprises requesting a handle from a memory manager in a Macintosh® operating system environment.

16. The method of claim 12, wherein said step of creating a header for said memory structures further comprises creating a field in said header for storing a date associated with said memory structures.

17. The method of claim 12, wherein said step of creating a header for said memory structures further comprises creating a field in said header for storing a parent-child relationship between two or more said memory structures.

18. The method of claim 12, further comprising the steps of:

creating a header type that indicates an end of a list of memory structures within said block of physical memory; and creating a starting memory block, which holds an entry point references into the other said memory structures held within said block of physical memory.

19. The method of claim 12, wherein said step of creating a header for said memory structures further comprises creating a field in said header for identifying a type of data, as distinct from a type of header, associated with said memory structures.

20. The method of claim 12, further comprising the step of:

creating a field within said header to identify an orphaned memory structures.

21. The method of claim 12, wherein said step of creating a header for said memory structures further comprises assigning values to one or more said fields within said header, said values including a physical offset between a start of said block of physical memory to a start of each said memory structure.

22. The method of claim 12, wherein said step of creating a header for said memory structures further comprises assigning values to one or more said fields within said header, said values including a signed relative memory offset between said referencing header and said referenced headere.

* * * * *

UNITED STATES PATENT AND TRADEMARK OFFICE
CERTIFICATE OF CORRECTION

| | |
|---|---|
| PATENT NO. | : 7,103,749 B2 |
| APPLICATION NO. | : 10/357288 |
| DATED | : September 5, 2006 |
| INVENTOR(S) | : John Fairweather |

It is certified that error appears in the above-identified patent and that said Letters Patent is hereby corrected as shown below:

<u>Column 10,</u>
line 34, Delete the word "headere" and replace with the word -- header --.
line 43, Delete the word "storee" and replace with the word -- stores --.

<u>Column 12,</u>
line 37, Delete the word "headere" and replace with the word -- header --.

Signed and Sealed this

Fifth Day of December, 2006

JON W. DUDAS
*Director of the United States Patent and Trademark Office*